No. 687,876. Patented Dec. 3, 1901.
J. E. FURLONG.
CUSHION TIRE.
(Application filed July 5, 1901.)
(No Model.)
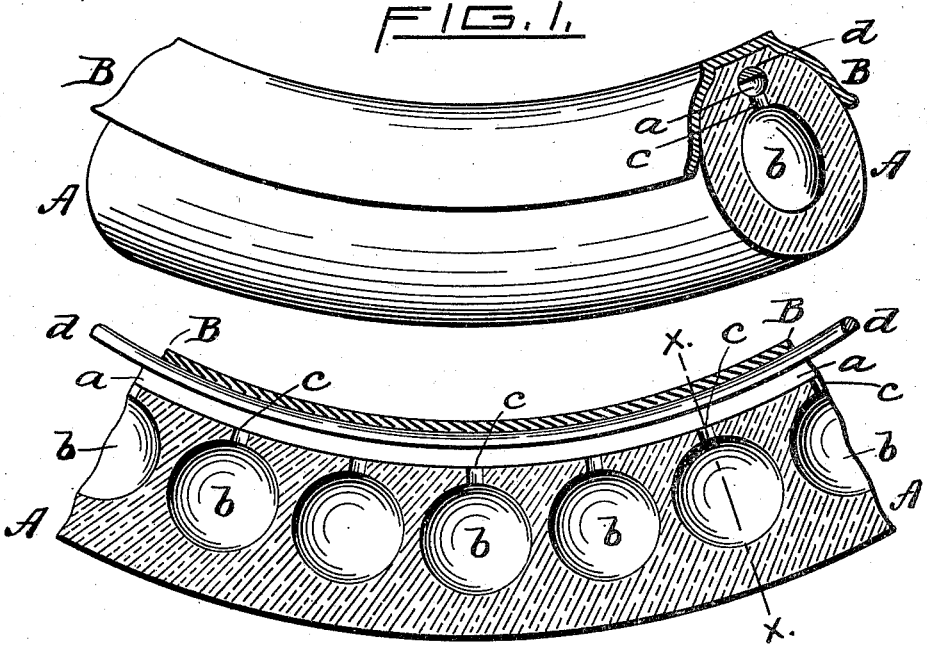
FIG. 1.
FIG. 2.
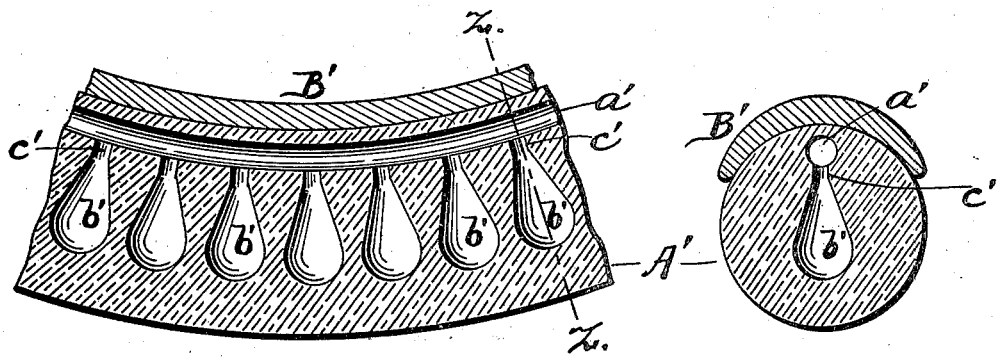
FIG. 3. FIG. 4.
WITNESSES. INVENTOR.
Charles T. Hannigan. James E. Furlong
Howard A. Lamprey By Warren R. Perce
Atty

UNITED STATES PATENT OFFICE.

JAMES E. FURLONG, OF PROVIDENCE, RHODE ISLAND.

CUSHION-TIRE.

SPECIFICATION forming part of Letters Patent No. 687,876, dated December 3, 1901.

Application filed July 5, 1901. Serial No. 67,165. (No model.)

*To all whom it may concern:*

Be it known that I, JAMES E. FURLONG, a citizen of the United States, residing at Providence, in the county of Providence and State of Rhode Island, have invented certain new and useful Improvements in Cushion-Tires, of which the following is a specification, reference being had therein to the accompanying drawings.

Like letters indicate like parts.

Figure 1 is a perspective view of my improved tire for bicycles and other vehicles and of the wheel-rim to which said tire is fastened, together with the wire by which the tire is secured to the wheel-rim, the section there shown being on line $x\ x$ of Fig. 2. Fig. 2 is a central longitudinal section of the same, the fastening-wire being, however, shown in side elevation. Fig. 3 is a central longitudinal section of a modified form of my said invention. Fig. 4 is a transverse section of said modified form of the device, the section there being shown on line $z\ z$ of Fig. 3.

My invention relates to cushion-tires for bicycles and other vehicles; and it consists of the novel construction and combination of the several elements, as hereinafter particularly described, and specifically set forth in the claims.

As shown in the drawings, the general exterior form of the tire A is cylindrical. There is a comparatively small longitudinal continuous bore $a$ near that side of the tire which is next to the wheel-rim. A series of (preferably) equidistant spherical sockets or cells $b$ is formed in the body portion of the tire and occupy a central longitudinal position in said tire. Said cells are separate from each other; but each of said sockets or cells $b$ individually opens into the bore $a$ by means of a passage $c$. A half-round wire $d$ passes lengthwise through the longitudinal bore $a$, as shown in Figs. 1 and 2. On the periphery of the wheel-rim is the double flange B, to which the contiguous portion of the tire A is cemented or otherwise secured. By drawing the wire $d$ tight and fastening its ends together the tire is bound to the wheel-rim. Said wire $d$ being half-round in cross-section fills only a portion of the longitudinal bore $a$ of the tire, leaving the other portion of said bore open for air-compression therein.

The action of my said improved tire in operation is this: The tire A is elastic, being made of india-rubber, and when the tread of the cylindrical tire A is compressed by the weight of the bicycle (or vehicle) and its rider the spherical socket or cell $b$ then lowermost in position is contracted or compressed, and the air therein is consequently forced up through the opening $c$ into the continuous bore $a$ and thence more or less into the contiguous cells $b$, which are not compressed. It is obvious, therefore, that a puncture of this improved tire does not seriously injure its utility, and the number of comparatively large cells $b$ in the series gives to the tire a considerable degree of elasticity.

In Figs. 3 and 4 I show a modified form of the device in which the tire A', cylindrical in shape, has the small longitudinal continuous bore $a'$, the pear-shaped cells $b'$, and the openings or passages $c'$, connecting the cells $b'$ with the longitudinal bore $a'$. Said tire A' is secured by cement or otherwise to the concaved wheel-rim B', and, if desired, a wire may be inserted longitudinally in the bore $a$ and tightened and fastened for binding the tire A' to the wheel-rim B'.

I claim as a novel and useful invention and desire to secure by Letters Patent—

1. The improved elastic and compressible tire for bicycles and other vehicles herein described, consisting of a body portion cylindrical in exterior shape and provided with an interior, continuous, longitudinal bore near one side thereof, a longitudinally-arranged series of air-cells, and a passage opening from each of said air-cells into said longitudinal bore, substantially as specified.

2. In combination with a flanged wheel-rim, an elastic, compressible tire, consisting of a body portion cylindrical in exterior shape and provided with an interior, continuous, longitudinal bore near one side thereof, a longitudinally-arranged series of air-cells, and a passage opening from each of said air-cells into said longitudinal bore, together with a fastening-wire extending through but not filling said longitudinal bore and adapted to bind said tire to the wheel-rim, substantially as shown.

In testimony whereof I affix my signature in presence of two witnesses.

JAMES E. FURLONG.

Witnesses:
WARREN R. PERCE,
HOWARD A. LAMPREY.